United States Patent
Suzuki et al.

(10) Patent No.: US 6,445,672 B1
(45) Date of Patent: Sep. 3, 2002

(54) DRIVE FOR STORAGE MEDIUM

(75) Inventors: Shoji Suzuki; Hitoshi Shirashima, both of Yoshima Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 164 days.

(21) Appl. No.: 09/626,198

(22) Filed: Jul. 28, 2000

(30) Foreign Application Priority Data

Aug. 6, 1999 (JP) ............................................ 11-223611

(51) Int. Cl.$^7$ ................................................ G11B 17/04

(52) U.S. Cl. ....................................................... 369/178

(58) Field of Search ............................... 369/75.1–75.2, 369/77.1, 178, 263, 264, 269

(56) References Cited

U.S. PATENT DOCUMENTS 5,101,399 A    3/1992   Watanabe et al.

*Primary Examiner*—Allen Cao
(74) *Attorney, Agent, or Firm*—Brinks Hofer Gilson & Lione

(57) ABSTRACT

A drive unit resiliently supported on a raising/lowering base via a damper includes a locking member to lock the drive unit when a storage medium such as a disc is loaded to or ejected from the drive unit. The locking member is provided with a cross-shaped rotating body provided on the raising/lowering base, and the drive unit is formed with a through hole. With the rotating body placed within the through hole, when the rotating body is rotated about 45° by a first switching member, the cross-shaped locking portion of the rotating body is pressed against an inner wall of the through hole so that the drive unit is locked in the X and Y directions.

24 Claims, 9 Drawing Sheets

X1 ←→ X2

DRIVE FOR STORAGE MEDIUM

BACKGROUND OF THE INVENTION

1. Field of the Invention

The present invention relates to a drive for a storage medium for locking the drive unit when the storage medium, such as a disc, is being loaded or ejected, and for supporting the drive unit in a resilient state when recording or reading from the storage medium is being carried out.

2. Description of the Related Art

FIG. 11A and FIG. 11B are side views showing a conventional disc drive in action, as an example of a vehicle-mounted drive for a storage medium. In this disc drive, a plurality of trays are provided in a magazine M to be mounted in the drive so as to be drawn out freely, and a disc D is placed on an individual tray T. The drive unit 1, facing the loading position of the magazine M, is provided with a drive chassis 2 and a clamp arm 5 rotatably supported by the drive chassis via an axle 7. The drive chassis 2 is provided with a turntable 3, a spindle motor 4 for rotating the turntable 3, and an optical head mounted thereon. The clamp arm 5 is provided with a damper 6 rotatably supported thereon.

In this disc drive, any one of trays T in the magazine M is selected by the movements of the drive unit 1 in the upward and downward directions of the figure. In the state where the drive unit 1 is halted at the position where a tray is selected, as shown in FIG. 11A, the clamp arm 5 turns upward, the tray T selected from the magazine M is drawn out toward the drive unit 1, and the center of the disc D on the tray T is clamped on the turntable by a damper 6. Upon completion of a driving operation of the disc D, the empty tray T is drawn out on the drive unit 1, and when the tray T reaches below the disc D, the clamp arm 5 moves upward, the damper 6 moves away from the disc D to release the disc D from the state of being clamped, and then the disc D in the free state is placed on the tray T and is returned into the magazine M.

When the disc drive is used as a vehicle-mounted drive, the drive unit 1 is required to be supported resiliently by means of resilient members 8, such as a damper, when the disc D is being loaded and driven as shown in FIG. 11B. By supporting the drive unit 1 resiliently in this way, even when vibration of the vehicle body is transmitted to the drive unit 1, the driving condition of the disc D may be prevented from being affected adversely by the vibration. On the other hand, as shown in FIG. 11A, when the disc D is drawn out from the magazine M, it is required to guide the center of the disc D so as to be located on the turntable 3, and when the disc D on the turntable is returned to the magazine M, it is required to accurately guide the disc D to the prescribed position in the magazine M. To meet this need, it is required to lock the drive chassis 2 of the drive unit 1 which is supported by the resilient members 8.

Conventionally, for locking the drive chassis 2 while the disc D is being loaded or ejected as described above, a means is generally used to lock the drive unit 1 by disposing a locking lever or the like outside the drive unit, and hooking the locking lever on the drive chassis 2 by advancing or rotating the locking lever.

However, there is a recognized disadvantage in that a significant area outside the drive unit 1 for the movement of the locking lever should be reserved when the locking lever is disposed outside the drive unit 1, which limits the arrangement of other components around the drive unit 1 and thus hinders the freedom of design.

In the structure of the type where the locking lever is hooked on the drive chassis 2 by advancing or rotating it outside the drive unit 1, one locking lever locks the drive unit in only one direction. Therefore, in order to lock the drive unit in all directions, it is necessary to dispose a number of locking levers so as to surround the drive unit, and thus the number of components to be provided around the drive unit 1 increases. In contrast, when the number of locking levers is decreased, there is a recognized disadvantage in that when the locking lever is hooked on the drive chassis 2, the drive unit 1 is urged in one direction and the position of the driving unit 1 is displaced, and thus the drive unit 1 cannot be located accurately with respect to the magazine M.

BRIEF SUMMARY OF THE INVENTION

Accordingly, it is an object of the present invention to overcome the problems described above and to provide a drive apparatus for driving a storage medium wherein the drive unit may be locked without any mechanism that substantially projects outside the drive unit so as not to limit the space around the drive unit.

It is another object of the invention to provide a drive apparatus for driving a storage medium wherein the drive may be locked in any direction by one or a small number of locking means so that the drive unit may be stably locked in every direction.

The present invention provides a drive apparatus comprising: a drive unit for recording to or reproducing from the storage medium supported on a base via a resilient member; a locking device for locking the drive unit on the base when the storage medium is loaded on the drive unit and/or when the storage medium is ejected from the drive unit; the locking device comprising: a through hole or non-through recess provided on one of the drive unit and the base; a rotating body provided on the other of the drive unit and the base to be placed in the hole or recess; and a rotating device for rotating the rotating body; the rotating body rotationally switched between a locking position where the drive unit is locked on the base with at least one portion thereof in contact with the hole or the recess and a lock releasing position where the rotating body comes off the wall in the through hole or the recess.

In the invention, by rotating the rotating body in the hole or the recess provided on the drive unit or the base, the drive unit may be locked and released from the locked state. Therefore, there is no need to dispose mechanical components constituting the locking device on the base around the drive unit, and thus the space around the drive unit may be used effectively.

The hole of the present invention may be a hole with a rectangular or triangular shaped opening, or may be a notched hole of which one side is opened on the edge of the drive unit.

For example, as shown in FIG. 10, the rotating body may be constructed in such a manner that the rotating body, when rotated to the locking position, comes into contact with at least two portions on the inner wall of the hole or the recess so that the movement of the drive unit on the base is locked in two different directions. Alternatively, as shown in FIG. 9, the rotating body may be constructed in such a manner that the rotating body, when rotated to the locking position, comes into contact with at least two opposite portions in the inner wall of the hole or the recess so that the movement of the drive unit on the base is locked in the opposite two directions.

In addition, as shown in FIG. 3, it is preferable that the rotating body, when rotated to the locking position, comes into contact with at least three points on the inner wall of the hole or the recess so that the movement of the drive unit on the base is locked in all directions in the plane orthogonal to the axis of rotation of the rotating body.

As shown in FIG. 7, a construction is also possible in which at least a portion of the rotating body, when rotated to the locking position, locks the inner wall of the hole or the recess in the direction parallel to the axis of rotation of the rotating body so that the movement of the drive unit on the base is locked in the direction parallel to the rotating shaft.

This invention is suitable for the case where the storage medium is in the shape of a disc, and the drive unit is provided with a rotating means for rotating the disc-shaped storage medium and a head facing or being in contact with the rotating storage medium. The storage medium may be of a form other than a disc, such as a cassette tape or IC package.

On the drive unit, there is provided a clamp means for holding the center of the disc-shaped storage medium to the rotating means, and the clamp driving means for driving the clamp means may also serve as the rotating device and rotate the rotating body to the lock releasing position when the clamp means is set to the state where the storage medium is held.

As described above, by sharing the rotating device for rotationally switching the rotating body and for actuating other mechanisms, it is not necessary to provide a drive means specifically designed for rotating the rotating body.

DETAILED DESCRIPTION OF THE INVENTION

Figure 1:
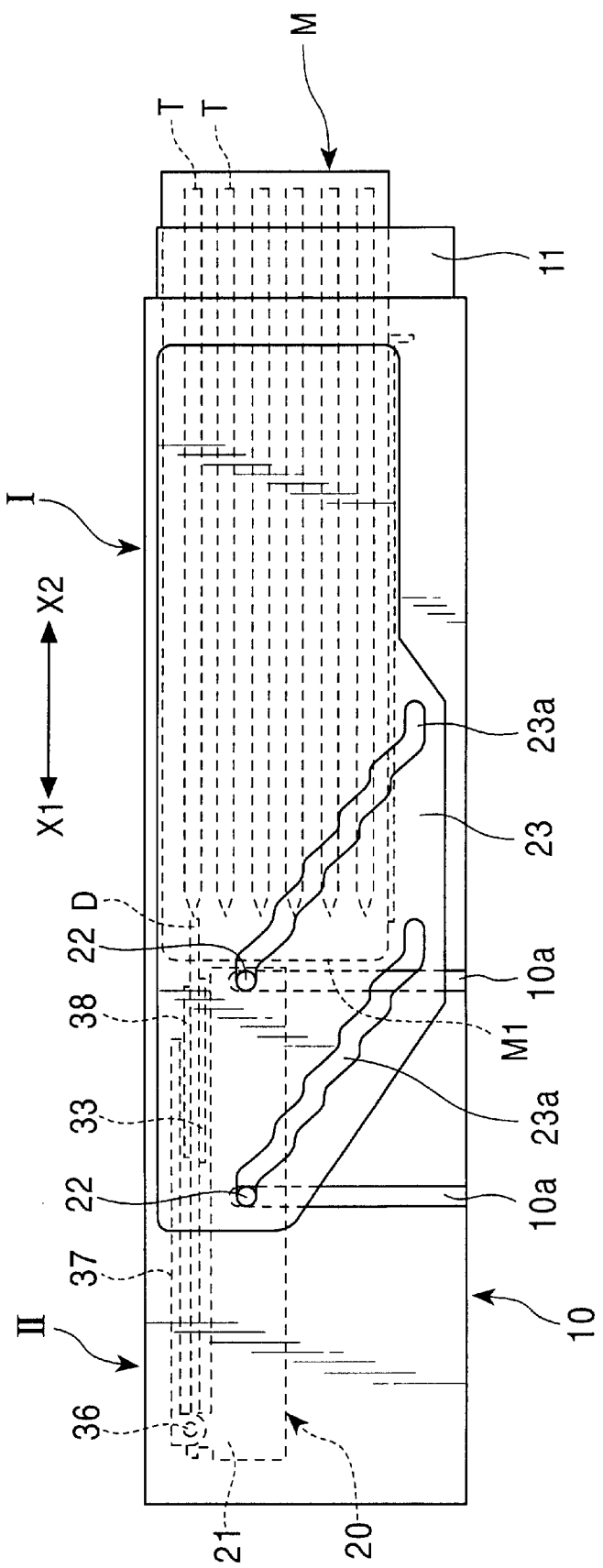
FIG. 1 is a side view illustrating an embodiment of the disc drive according to the present invention.
Figure 2:
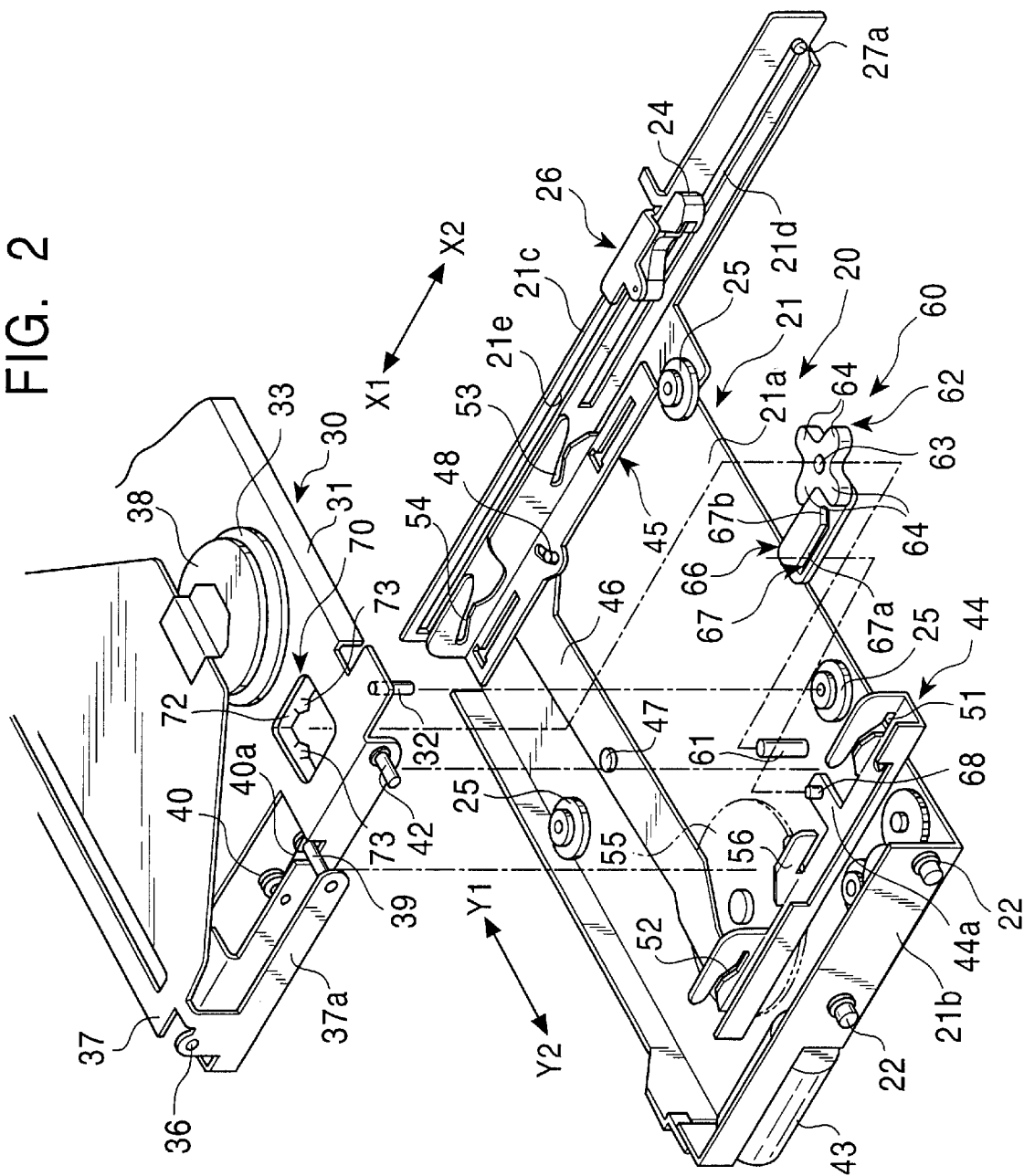
FIG. 2 is a perspective view illustrating a raising/lowering base and a drive unit constituting a raising/lowering unit.
Figure 3:
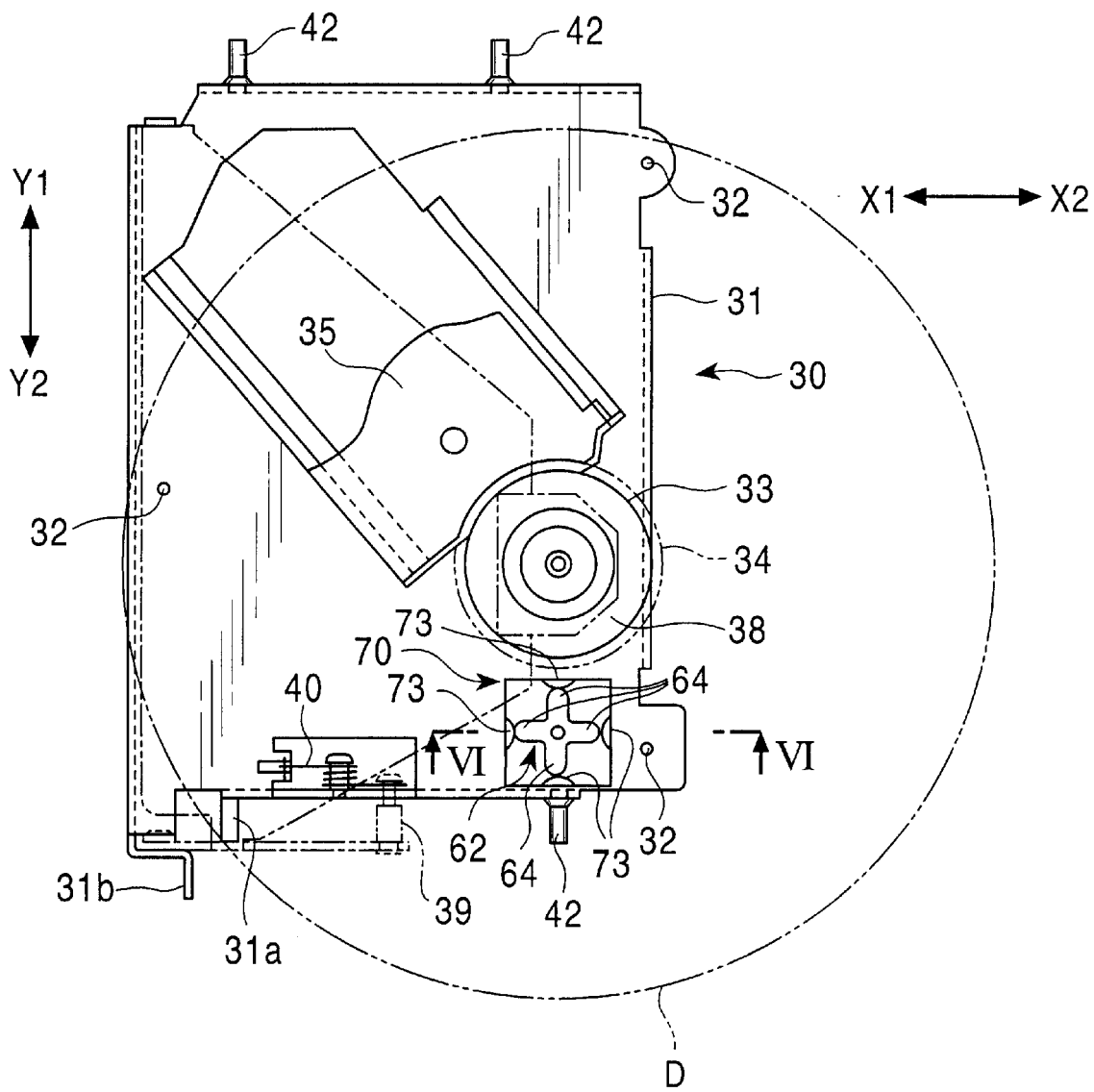
FIG. 3 is a plan view illustrating the drive unit.
Figure 4A:
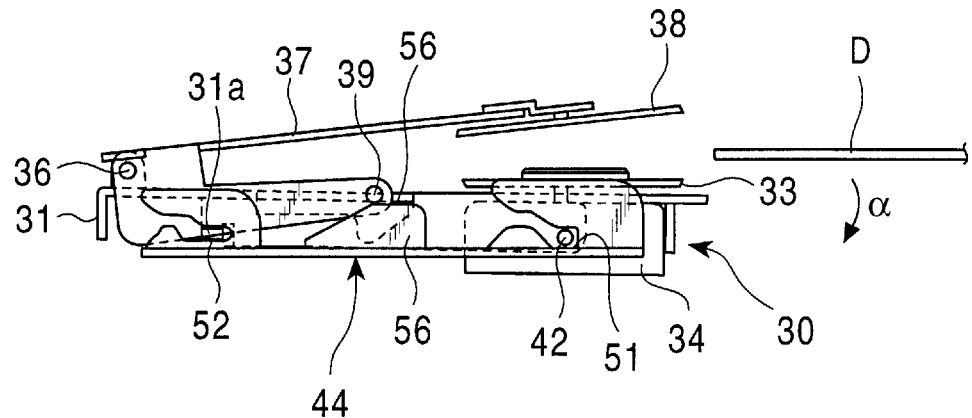
FIGS. 4A, 4B, and 4C are partial side views illustrating the disc clamping and disc clamp releasing actions by the drive unit.
Figure 4B:
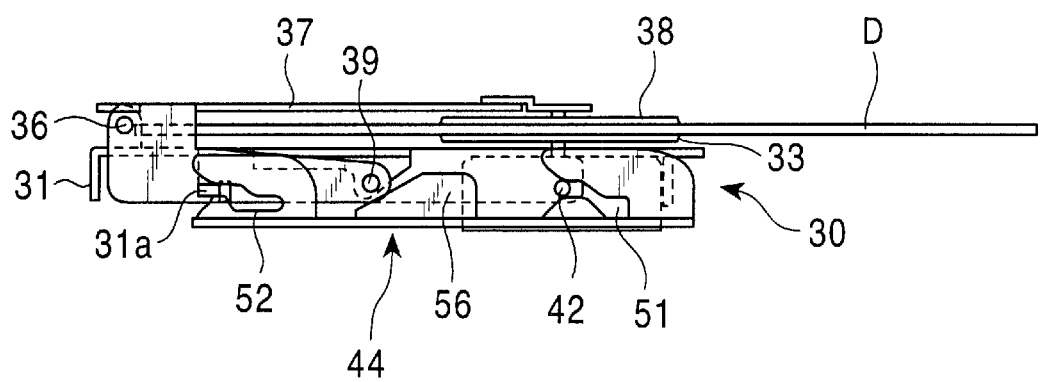
Figure 4C:
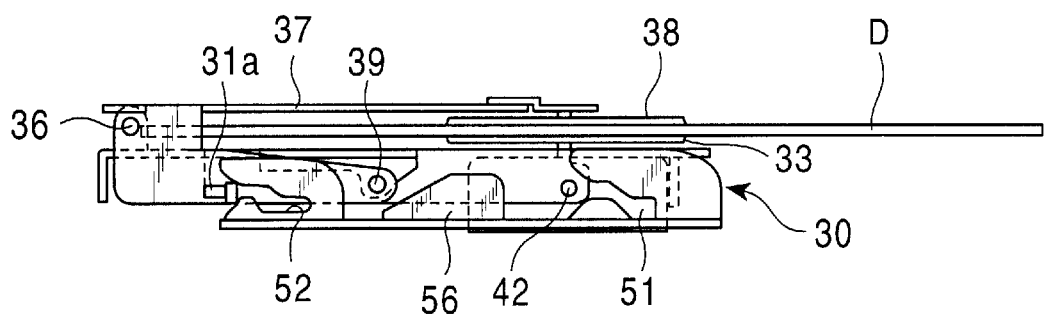
Figure 5A:
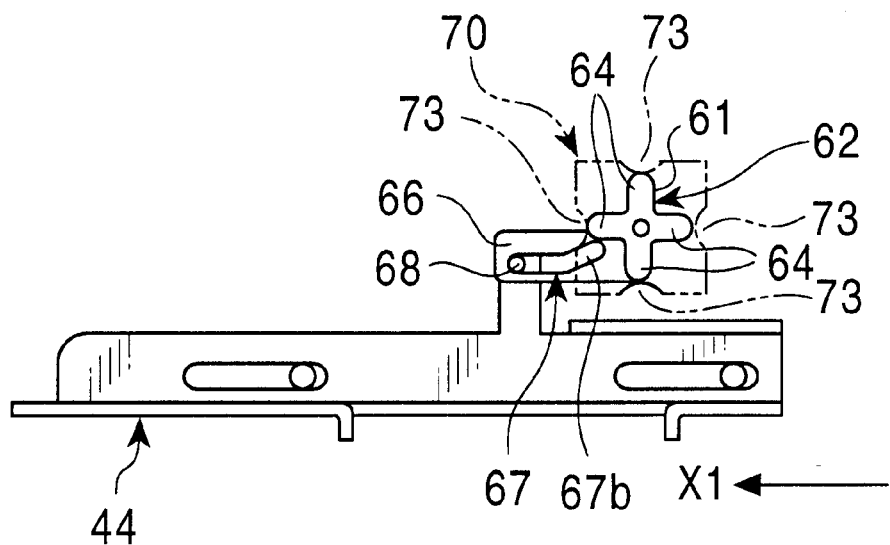
FIGS. 5A and 5B are partial plan views illustrating the locking means, shown in operation.
Figure 5B:
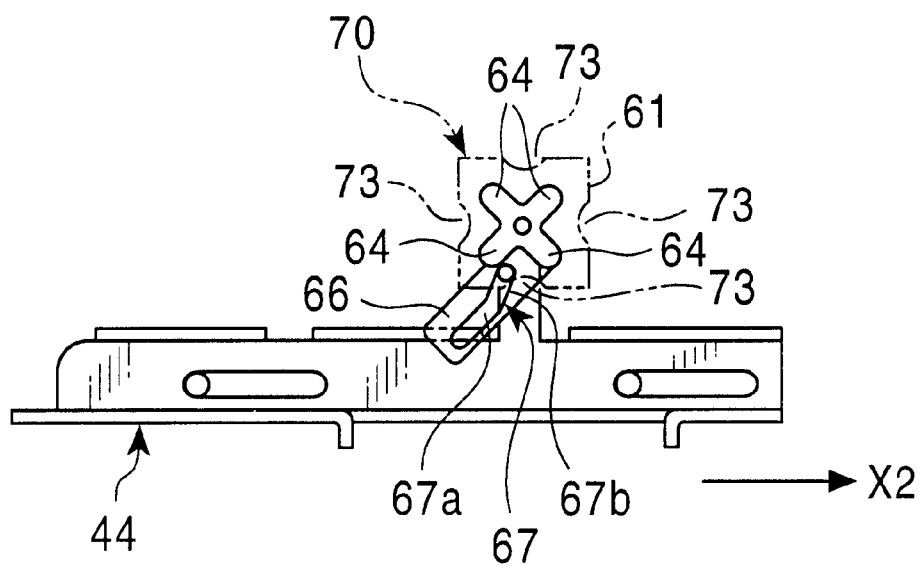
Figure 6:
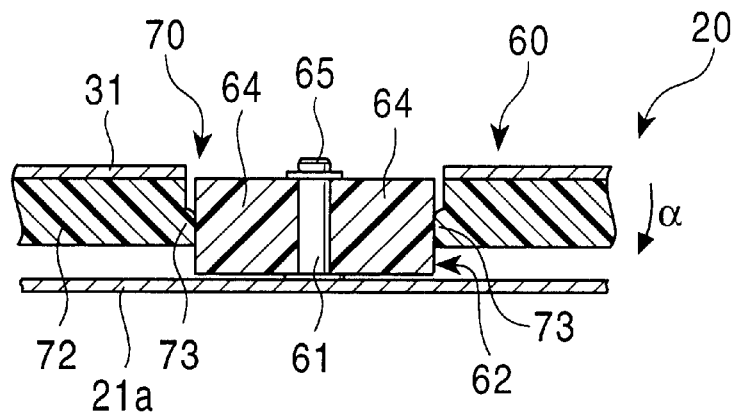
FIG. 6 illustrates the locked state of the locking means, ina cross-sectional view taken along the line VI—VI in FIG. 3.

FIG. 1 is a side view illustrating a disc drive of the invention, FIG. 2 is a perspective view illustrating a raising/lowering base and a drive unit supported thereon, FIG. 3 is a plan view of a drive unit, FIGS. 4A, 4B, and 4C are side views illustrating disc clamp actions, shown in operation, FIGS. 5A and 5B are partial plan views showing states in which the rotating body is rotationally switched, respectively, into the locking position and the lock releasing position, and FIG. 6 is a cross sectional view taken along the line VI—VI of FIG. 3 showing a state of contact between the hole provided on the locking means and the rotating body.

As shown in FIG. 1, on the front portion of an enclosure 10, a face 11 is fixed as a decorative portion. An insertion port is opened on the face 11, and a magazine M is inserted through the insertion port into the enclosure 10 along the length thereof.

The magazine M is a box-like body formed with an opening M1 on the left side of the figure (the back side of the unit; X1 side), and a plurality of trays T are retained therein so as to be withdrawable freely from the opening M1. On each tray T, there is a disc of an optical storage system or a photo-electromagnetic system such as a compact disc or a digital versatile disc placed thereon.

A raising/lowering unit 20 is provided in the enclosure 10 at the back. As shown in FIG. 2, in the raising/lowering unit 20, a drive unit 30 is supported on the raising/lowering base 21. Referring now to FIG. 1 and FIG. 2, there are guide pins 22 fixed on both sides of the raising/lowering base 21. As shown in FIG. 1, on both side plates of the enclosure 10, there formed raising/lowering guide grooves 10a extending vertically and in which the guide pins 22 are inserted, so that the raising/lowering base 21 and a raising/lowering unit 20 are supported to move freely up and down in the enclosure 10.

As shown in FIG. 1, a selective driving plate 23 is provided externally of one of the side plates of the enclosure 10 and is supported so as to slide freely along the direction X1–X2. There is also another selective driving plate provided externally on the other side plate of the enclosure 10. On the bottom of the enclosure 10, a selective driving portion (not shown) is provided for driving both selective driving plates in opposite directions with respect to each other.

As shown in FIG. 1, the selective driving plate 23 is provided with step-wise inclined selecting holes 23a, in which the guide pins 22 formed on the raising/lowering base 21 are inserted. In FIG. 1, when the selective driving plate 23 moves in the direction X1, the raising/lowering unit 20 moves downward by being guided along the selection holes 23a, and when the selective driving plate 23 moves in the direction X2, the raising/lowering unit 20 moves upward. When the guide pins 22 are positioned on the step portion of the selection holes 23a, the raising/lowering unit 20 is halted at a position where one of trays in the magazine M can be selected.

As shown in FIG. 2, the raising/lowering base 21 is provided with a bottom plate 21a and side plates 21b and 21c bent so as to stand upward as a single piece at both sides of the bottom plate 21a.

The bottom plate 21a is provided with three dampers 25 as resilient supporting members thereon. The drive chassis 31 of the drive unit 30 is provided with supporting pins 32 extending downward at three positions, which are in turn supported by the corresponding dampers 25. The drive unit 30 is therefore supported resiliently via the dampers 25 as resilient supporting members on the bottom plate 21a on the raising/lowering base 21. In the case where it is a vehicle-mounted drive, by supporting the drive unit 30 resiliently on the raising/lowering base 21, even when vibrations of a car body act upon the enclosure 10, the vibrations of the car body are prevented from being transmitted directly to the drive unit 30.

As shown in FIG. 2 and FIG. 3, the drive chassis 31 is provided with a turntable 33 rotatably supported thereon, and a spindle motor 34 for rotating the turntable 33 is fixed on the bottom of the drive chassis. Also on the drive chassis 31, there is provided an optical head 35 and a threaded mechanism for moving the optical head 35 along the recording surface of the disc.

As shown in FIG. 2 and FIG. 4, the drive chassis 31 is provided with a clamp arm 37. The proximal end of the clamp arm 37 is rotatably supported on the drive chassis 31 by a rotation fulcrum 36. The distal end of the clamp arm 37 is provided with a damper 38 rotatably supported thereon.

A lifting arm 37a extending in the direction X2 is integrally formed on the side of the clamp arm 37, and a lifting pin 39 is fixed on the tip of the lifting arm 37a. The drive chassis 31 is provided with a clamp spring 40 thereon. The clamp spring 40 is a torsion spring, and one of the arms thereof is supported by the drive chassis 31, while the other one of the arms 40a is hooked on the lifting pin 39 from above. The spring force of the clamp spring 40 urges the clamp arm 37 toward the drive chassis 31, so that the damper 38 is pressed against the turntable.

As shown in FIG. 3, on the side surface of the drive chassis 31 on the Y2 side, a guide pin 42 is fixed on the front portion thereof and a guide piece 31a is integrally formed on the opposite rear portion by bending a portion thereof. On the side surface of the drive chassis 31 on the Y1 side, guide pins 42 are fixed respectively on the front portion and the rear portion.

As shown in FIG. 2, the side plate 21c of the raising/lowering base 21 on the Y1 side extends along the direction X1–X2. The side plate 21c is formed with a pair of transport guide grooves 21d and 21e extending along the direction X1–X2. A transport member 26 is provided externally of the side plate 21c. A pair of guide pins 27a is fixed on the transport member 26. One of the guide pins 27a is inserted into one of the transport guide grooves 21d and the other of the guide pins 27a is inserted into the other of the transport guide grooves 21e.

A hook 24 is rotatably mounted on the transfer member 26. When the transfer member 26 is driven in the direction X1 by a transfer drive means (not shown), the hook 24 is hooked on the side of the selected tray T in the magazine M, and the tray T is drawn out toward the drive unit 30 by the hook 24. After the center of the disc D placed on the tray T is set on the turntable 33, the tray T is returned to the magazine M by the hook 24. Upon completion of a driving operation of the disc D by the drive unit 30, the tray T in the magazine M is drawn out into the drive unit 30 by the hook 24, and the tray T including the disc D for which driving has been completed is placed thereon and is returned into the magazine M by the hook 24.

The raising/lowering base 21 is provided with a cam gear 55, which is rotated by a switching motor 43 mounted on the raising/lowering base 21 in the normal and reverse directions.

On the upper surface of the bottom plate 21a of the raising/lowering base 21, a first switching member 44 and a second switching member 45 are mounted so as to slide freely along the direction X1–X2. On the lower surface of the first switching member 44, there is provided a follower shaft fixed thereon, which is inserted into the cam groove formed on the cam gear 55 through the opening formed on the bottom plate 21a so as to slide therein.

A connecting member 46 is rotatably supported by a pivot 47 on the upper surface of the bottom plate 21a. The connecting pin provided on one end of the connecting member 46 engages to the first switching member 44 and the connecting pin 48 provided on the other end of the connecting member 46 is fitted to the second switching member 45.

When the cam gear 55 rotates, the first switching member 44 is driven in the direction X1, and simultaneously, the second switching member 45 is driven in the direction X2. Conversely, when the cam gear rotates in the reverse direction, the first switching member 44 is driven in the direction X2, and simultaneously the second switching member 45 is driven in the direction X1.

The standing portion of the first switching member 44 is formed with locking grooves 51 and 52, and the standing portion of the second switching member 45 is formed with locking grooves 53 and 54. A guide pin 42 and a guide piece 31a provided on both sides of the drive chassis 31 of the drive unit 30 may be locked by the locking grooves 51 and 52 and by the locking grooves 53 and 54. The first switching member 44 is provided with a clamp cam 56 for lifting and controlling the lifting pin 39 fixed on the clamp arm 37 provided on the drive unit 30.

Locking means 60 is provided between the raising/lowering base 21 and the drive chassis 31 of the drive unit 30. The locking means 60 comprises a rotating body and a through hole 70.

In the locking means 60 a supporting shaft 61 is fixed on the bottom plate 21a of the raising/lowering base 21, and the rotating body 62 is rotatably supported by the supporting shaft 61 (see FIG. 6). The rotating body 62 is made of a synthetic resin and is formed with a shaft hole 63 through which the supporting shaft 61 is inserted in the center thereof. The rotating body is integrally formed with locking portions 64 extending in four directions, intersecting at right angles along the periphery thereof. The dimensions of the respective locking portions 64 from the tip to the center of the shaft hole 63 are identical, and thus the configuration of the rotating body 62 in plan view is a regular cross. As shown in FIG. 6, a retaining ring 65 is fitted to the tip of the supporting shaft 61 after the supporting shaft 61 is passed through the shaft hole 63, so that the rotating body 62 does not come off the supporting shaft 61.

As shown in FIGS. 5A and 5B, the rotating body 62 is integrally formed with a drive plate 66. The drive plate 66 has an elongated hole 67 formed therein. The elongated hole 67 includes a linear portion 67a and a curved portion 67b connected with each other.

The first switching member 44 mounted on the raising/lowering base 21 has an integrally extending drive arm 44a, which has a drive pin 68 fixed thereon. As shown in FIG. 5, the drive pin 68 is slidably inserted into the elongated hole 67 formed on the drive plate 66.

As shown in FIG. 2, the drive unit 30 is formed with a through hole 70. The through hole 70 is square and has a pair of parallel sides extending along the direction X1–X2 and a pair of parallel sides extending along the direction Y1–Y2. The through hole 70 is formed through the drive chassis 31 and a resin chassis 72 fixed on the lower surface of the drive chassis 31.

As shown in FIG. 2, the through hole 70 has projections 73 at four positions on the inner wall of the resin chassis 72. The projections 73 are formed on the X1 side, the X2 side, the Y1 side and the Y2 side respectively. As shown in FIG. 6, each projection 73 has a surface curved in the vertical direction and formed with a profile such that the lower side can mate with the tip portion of each locking portion 64 on the rotating body without any gap formed therebetween.

The operation of the disc drive will now be described.

FIG. 4A illustrates a disc-waiting state (the state where the disc is not loaded), FIG. 4B illustrates a state where the drive unit 30 is locked and the disc is clamped (the state where the disc is loaded), and FIG. 4C illustrates the state where the lock of the drive unit is released and the disc is clamped (the state where the disc is loaded).

As shown in FIG. 4A, in the disc-waiting state where the tray T and disc D in the magazine M is being selected, the first switching member 44 on the raising/lowering base 21 shown in FIG. 2 is moved to the X1 side, and the second switching member 45 is moved to X2 side. At this time, the guide pin 42 provided on the side of the drive chassis 31 of the drive unit 30 is retained at the end on the X2 side of the locking groove 51 on the first switching member 44, and the guide piece 31a is retained at the end on the X2 side of the locking groove 52 of the first switching member 44. Likewise, guide pins 42 fixed on the side surface of the drive chassis on the Y1 side are retained at the end on the X2 side of respective locking grooves 53 and 54 of the second switching member 45.

When the guide pins 42 and the guide piece 31a of the drive chassis 31 are retained in respective locking grooves 51, 52, 53, and 54, the drive chassis 31 is lowered so as to be brought closer to the bottom plate 21a of the raising/lowering base 21 as a whole. In this state, the dampers 25 are pressed and deformed. The locking groove 51 of the first switching member 44 and the locking groove 53 of the second switching member 45 are formed at positions closer to the lower side of the figure (the side toward the bottom plate 21a of the raising/lowering base 21). Therefore, in the disc-waiting state of FIG. 4A, the end of the drive unit 30 on the X2 side faces downward and the drive chassis 31 of the drive unit 30 is slightly tilted in the direction α.

In the state shown in FIG. 4A, the lifting pin 39 of the clamp arm 37 is lifted upward by the clamp cam 56 formed on the first switching member 44, and the clamper 38 provided at the tip of the clamp arm 37 stays away from the turntable 33. Therefore, in the state shown in FIG. 4A, the clamp arm 37 is inclined upwardly and the drive chassis 31 is inclined downwardly in the direction α, and thus the drive chassis 31 and the damper 38 are vertically opened so as to facilitate guiding of the disc D in the direction X1.

On the other hand, in the locking means 60, as shown in FIG. 5A, since the first switching member 44 is moved in the direction X1, the drive pin 68 is positioned at the end on the X1 side of the linear portion 67a of the elongated hole 67 formed on the drive plate 66 of the rotating body 62, the thus the rotating body 62 is rotated clockwise in the through hole 70 of the drive unit 30, and locking portions 64 of the rotating body 62 are oriented in the directions X1, X2, Y1, and Y2, respectively.

In this state, as shown in FIG. 3, the projections 73 formed on the inner surface of the resin chassis 72 within the through hole 70 and the tip portions of the respective locking portions 64 of the rotating body 62 are brought into intimate contact with each other, preferably in the state of pressing-contact. The drive unit 30 is locked on the raising/lowering base 21 in all the directions X1–X2 and Y1–Y2 by pressing-contact, with the respective locking portions of the cross-shaped rotating body 62 and the respective projections 73 being in contact with each other. In other words, the drive unit 30 is locked so as not to move in any direction within the plane of the drive chassis 31.

As shown in FIG. 6, the projections 73 formed on the inner surface of the through hole 70 have curved surfaces, and thus the tip portions of the locking portions 64 and the projections 73 are in contact with each other at a position close to the bottom plate 21a of the raising/lowering base by being in nearly point contact or by being in contact in a minimal area. Therefore, it is possible to tilt the drive unit slightly with respect to the rotating body 62 with the locking means 60 retained in the locked state. As a consequence, as shown in FIG. 4A, even when the drive unit 30 is tilted as a whole so that the X2 side end of the drive unit 30 rotates in the direction α in the waiting state, an unbalanced force is not generated between the rotating body 62 and the through hole 70, and no stress is applied to the drive chassis 31 and the resin chassis 72 of the drive unit 30, which ensures locking of the drive unit 30 in the directions X1–X2 and Y1–Y2.

As shown in FIG. 4A, the selecting operation of the tray T in the magazine M is performed in the state where the drive unit 30 is locked on the raising/lowering base 21 in the directions X and Y by means of the locking means 60 and the damper 38 is rotated upwardly. In this selecting operation, the selecting drive plate 23 provided on the side of the enclosure shown in FIG. 1 moves along the direction X1–X2, and the raising/lowering unit 20 is guided upwardly and downwardly by the selecting holes 23a formed in the selecting drive plate 23. The selecting drive plate 23 stops with the raising/lowering unit 20 placed in front of and facing the tray T to be selected in the magazine M.

Next, the transfer member 26 shown in FIG. 2 moves from the end on the X2 side in the direction X1, and the tray T selected within the magazine M is drawn out from the magazine M by the hook 24 in the direction X1. When the center of the disc D on the tray T that is drawn out from the magazine M coincides with the center of the turntable 33, the disc clamping operation starts and the disc D is held and clamped between the turntable 33 and the damper 38. Upon completion of the clamping operation, the transfer member 26 moves in the direction X2 to return the empty tray T into the magazine M.

In the clamping operation, when the center of the disc D on the tray T drawn from the magazine M coincides with the turntable 33, the cam gear 55 of the raising/lowering base 21 rotates, the first switching member 44 moves in the direction X2, and the second switching member 45 moves in the direction X1. During this movement, the state shown in FIG. 4B is achieved, and the guide pins 42 and the guide piece 31a of the drive chassis 31 reach the upper protrusion of the locking grooves 51, 52, 53, and 54 just before leaving the locking grooves 51, 52, 53, and 54. At this time, the drive unit 30 is slightly lifted from the state shown in FIG. 4A to be horizontal.

The turntable 33 is fitted to the center bore of the disc D on the tray T from below by a slight lifting operation of the drive unit 30. At the same time, the clamp cam 56 is released from the lifting pin 39, the clamp arm 37 is rotated by the resiliency of the clamp spring 40, and the center portion of the disc D on the tray T that is drawn out is clamped between the turntable 33 and the damper 38. Then, as described above, upon completion of a clamping operation, the transfer member 26 returns the empty tray T into the magazine M.

When the locking means 60 is in the locked state, as shown in FIG. 5A, the linear portion 67a of the elongated hole 67 of the rotating body 62 extends along the direction X1–X2. Therefore, when the first switching member 44 is moved from the position shown in FIG. 4A in the direction X2 into the state shown in FIG. 4B, the drive pin 68 provided on the first switching member 44 moves along the linear portion 67 in the direction X2. At this time, the rotating body 62 does not rotate, and thus the drive unit 30 remains locked by the rotating body 62 along the directions X1–X2 and Y1–Y2.

When the first switching member 44 moves further in the direction X2 into the state shown in FIG. 4C, and the second switching member 45 similarly moves in the direction X1, the guide pins 42 and the guide piece 31a of the drive unit 30 comes off the locking grooves 51, 52, 53, and 54, respectively.

When the first switching member 44 moves from the state shown in FIG. 4B to the state shown in FIG. 4C, the drive pin 68 provided on the first switching member 44 comes into the curved portion 67b of the elongated hole 67, as shown in FIG. 5B, and the rotating body 62 rotates counterclockwise through 45°. At the same time, the locking portions 64 of the rotating body 62 come off the projections 73 on the inner wall of the through hole 70 of the drive unit 30, thereby releasing the locked state of the locking means 60.

As described above, the drive unit 30 is released from the locked state on the raising/lowering base 21 with the disc D clamped on the turntable 33, and the dampers 25 resiliently support the drive unit 30. In this state, the disc is rotated and the optical head 35 carries out recording and playing.

Upon completion of driving of the disc D, the empty tray in the magazine M is drawn toward the drive unit 30 by the hook 24 of the transfer member 26 shown in FIG. 2, and the empty tray T is moved below the disc D clamped on the turntable 33. Then the cam gear 55 on the raising/lowering base 21 rotates and the first switching member 44 moves from the state shown in FIG. 4C in the direction of X1, and simultaneously, the second switching member 45 moves in the direction X2.

When the first switching member 44 moves from the position shown in FIG. 4C to the position shown in FIG. 4B, the rotating body 62 is rotated clockwise from the state shown in FIG. 5B through 45° into the state shown in FIG. 5A, and the drive unit 30 is locked by the rotating body 62 in the locking means 60. Then the state shown in FIG. 4A is achieved, and the damper 38 comes off the disc D and releases the disc D from the state of being clamped. Then the transfer member 26 moves in the direction X2, and the tray on which the disc D, released from the clamped state, is placed is returned to the magazine M.

Alternative embodiments of the locking means will now be described.

Figure 7:
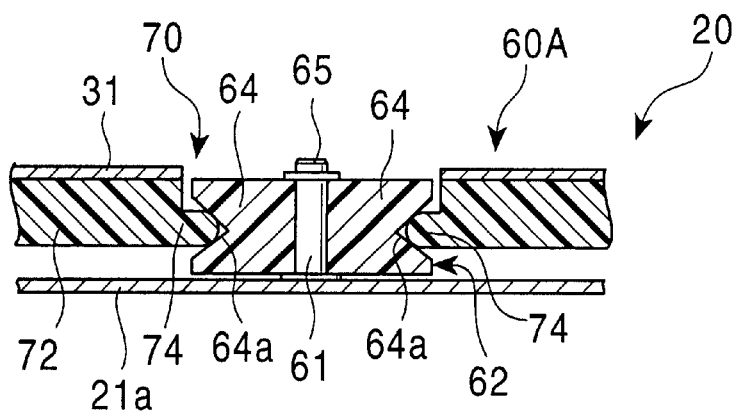
FIG. 7 is a cross-sectional view illustrating an alternative locking means.

In the locking means 60A shown in FIG. 7, a rotating body 62, having a cross-shaped plane as shown in FIG. 2 or FIG. 5, is used. At least two of the four locking portions 64 of the rotating body 62 are provided with V-shaped contact recess portions 64a thereon. The inner wall of the resin chassis 72 of the through hole 70 formed on the drive unit 30 is formed with fitting contact portions 74. When the rotating body 62 rotates into the state shown in FIG. 5A, the drive unit 30 is locked in all the directions X1–X2 and Y1–Y2 by each locking portion 64 formed on the rotating body 62, and each fitting contact portion 74 is fitted into each contact recess portion 64a. Therefore, the drive unit 30 is also locked in the direction of the axis of the supporting shaft 61 of the rotating body 62. The locking means 60A of this type makes it possible to lock the drive unit 30 in three dimensions.

Figure 8:
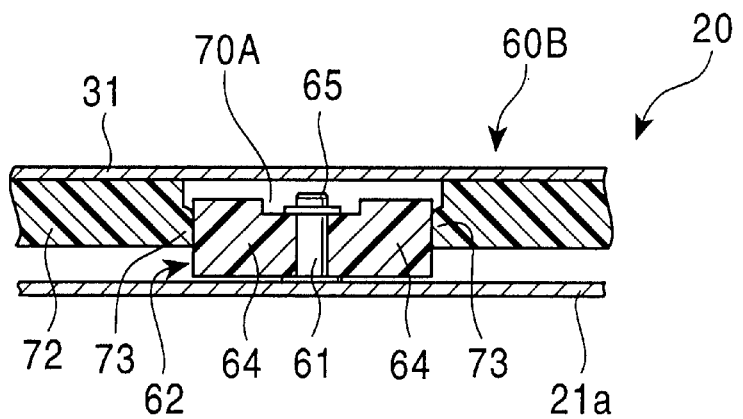
FIG. 8 is a cross-sectional view illustrating another alternative locking means.

In the locking means 60B shown in FIG. 8, a non-through recess 70A is formed on the drive unit 30, and the inner wall of the recess portion 70A is formed with projections 73. The rotating body 62 provided on the side of the raising/lowering base 21 is inserted into the recess 70A, and by rotating it within the recess 70A, it assumes the locking position shown in FIG. 5A or the non-locking position shown in FIG. 5B.

Figure 9:
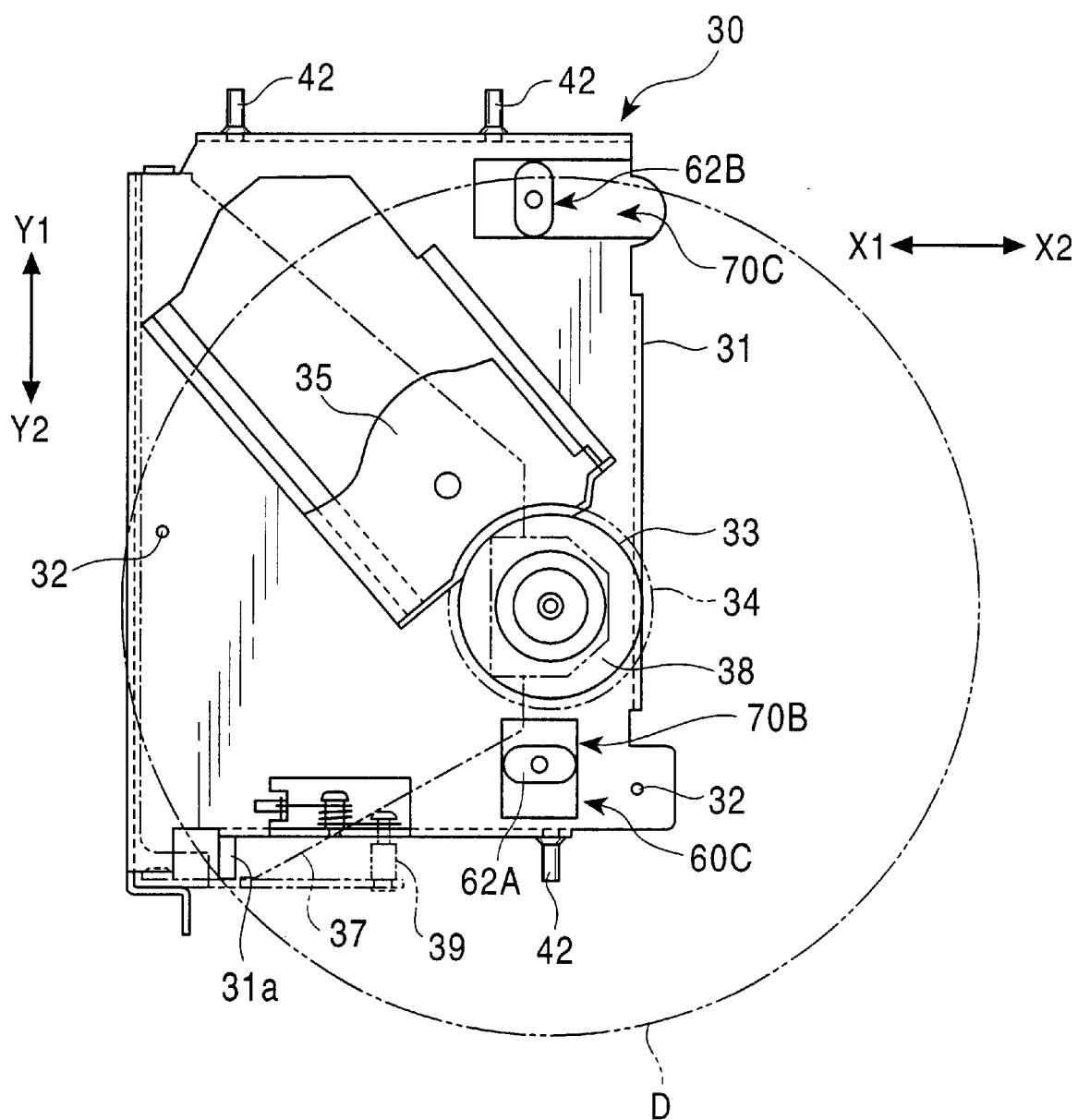
FIG. 9 is a plan view of the drive unit illustrating an alternative locking means.

In the locking means 60C shown in FIG. 9, two through holes 70B and 70C are formed on the drive unit 30. In this case, one of the through holes 70C is a notched hole having an opening on one side.

On one side of the raising/lowering base 21, there are provided rotating bodies 62A and 62B to be inserted into respective through holes 70B and 70C. FIG. 9 illustrates the state where the rotating bodies 62A and 62B are rotated into the locking position. At the same time, both end portions of the rotation body 62A are pressed against the opposed inner walls of the through hole 70B and the drive unit 30 is locked in the opposing directions X1 and X2. Simultaneously, both end portions of the rotating body 62B are pressed against the opposing inner walls of the through hole 70C and the drive unit 30 is locked in the opposed directions Y1 and Y2. Therefore, the drive unit 30 is locked in every direction in the X–Y plane. When the rotating bodies 62A and 62B rotate through 90°, the drive unit 30 is released from the locked state.

Figure 10:
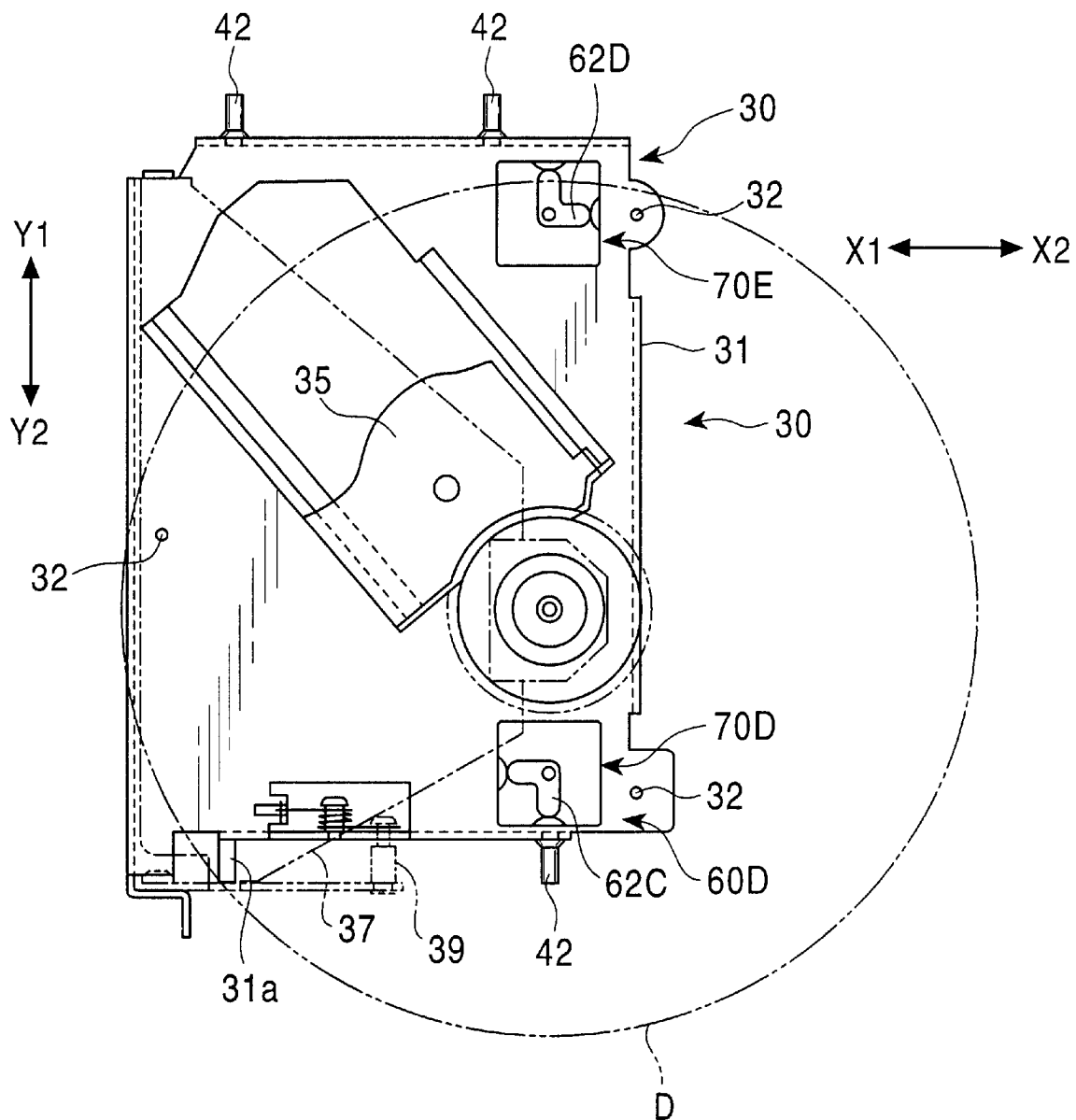
FIG. 10 is a plan view of the drive unit illustrating another alternative locking means.
Figure 11A:
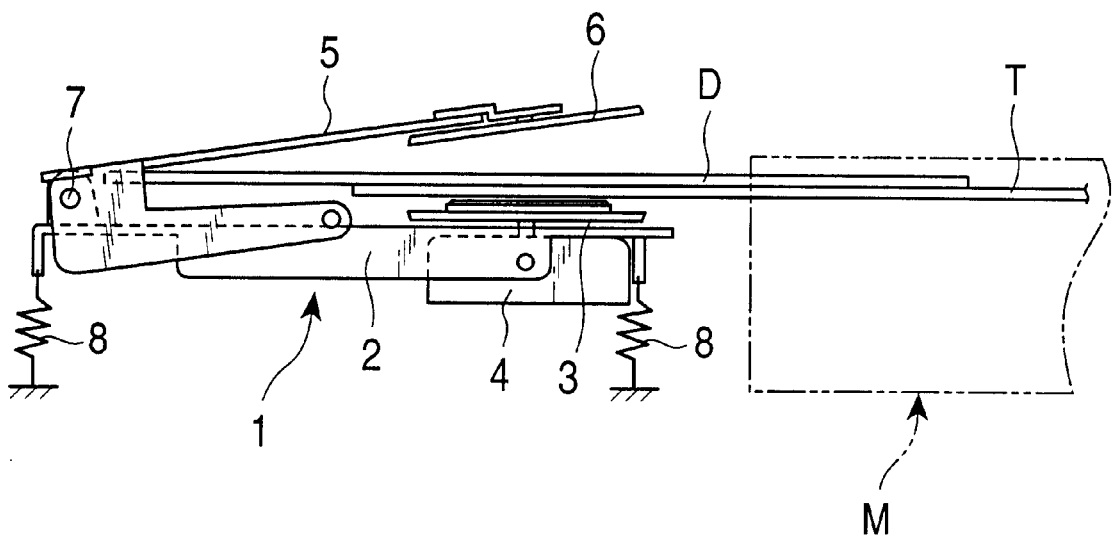
FIGS. 11A and 11B are side views illustrating a conventional disc unit, shown in operation.
Figure 11B:
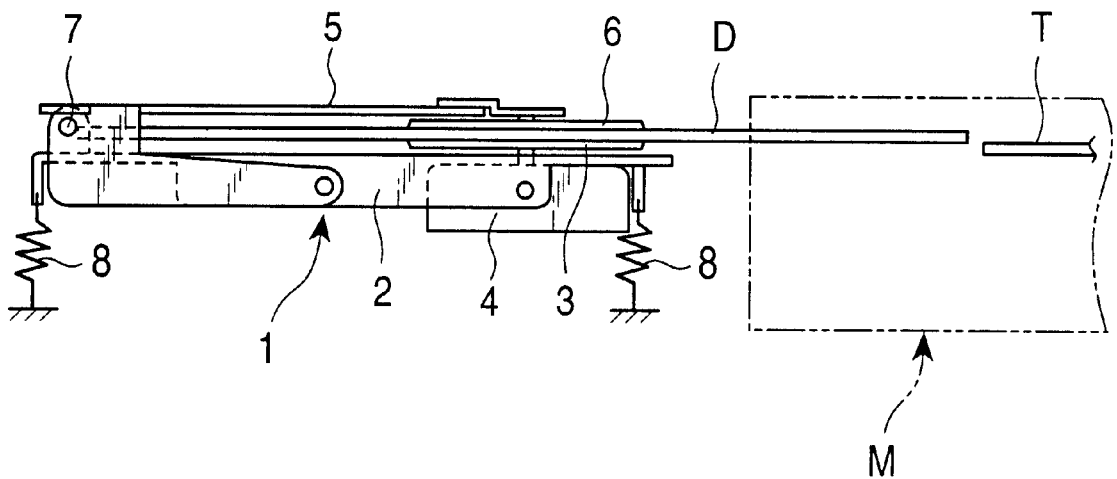

In the locking means 60D shown in FIG. 10, the drive unit 30 is provided with two through holes 70D and 70E.

On one side of the raising/lowering base 21, there are provided rotating bodies 62C and 62D to be inserted into the through holes 70D and 70E, respectively. FIG. 10 illustrates the state where the rotating bodies 62C and 62D are rotated to the locking positions. At the same time, the end portions of the rotating body 62C are pressed against the inner walls on two sides of the through hole 70D and the drive unit 30 is locked in the directions X2 and Y1 that intersect with each other. Simultaneously, the end portions of the rotating body 62D are pressed against the inner walls on two sides of the through hole 70E and the drive unit 30 is locked in the directions X1 and Y2 that intersect with each other. Therefore, the unit 30 is locked in all directions in the X–Y plane. When the rotating bodies 62C and 62D are rotated from the state shown in FIG. 10, the drive unit 30 is released from the locked state.

In contrast to the embodiments described above, a rotating body may be provided on one side of the drive unit, and a through hole or a recess may be formed on one side of the raising/lowering base.

The invention is not limited to the disc drive for a disc selection system wherein the magazine is loaded, but it is also applicable to disc drives in which discs are loaded individually.

As described thus far, according to the present invention, the locking means for locking the drive unit may be constructed as a mechanism that does not significantly project outwardly of the drive unit, thus the locking means does not occupy a large space around the drive unit.

In addition, a structure wherein the drive unit is locked in multiple directions by a single locking means may also be realized easily.

What is claimed is:

1. A drive apparatus for driving a storage medium comprising:
    a base;
    a drive unit for recording on or reproducing from the storage medium, wherein said drive unit is supported on the base via a resilient member; and
    a locking device for locking said drive unit on the base when the storage medium is loaded to said drive unit or when the storage medium is ejected from the drive unit; said locking device including:

one of a through hole and a non-through recess formed on one of said drive unit and the base, a rotating body provided on the other of said drive unit and the base to be placed in said through hole or the recess, and a mechanism for rotating said rotating body;

wherein said rotating body is rotationally switched between a locking position where at least one portion of said rotating body comes in contact with an inner wall of said through hole or the recess to lock the drive unit on the base and a lock released position here said rotating body comes off said inner wall within said through hole or the recess.

2. The drive apparatus for driving a storage medium as set forth in claim 1 wherein said rotating body, when rotated to said locking position, comes in contact with at least two portions of the inner wall of said through hole or the recess to lock the movement of said drive unit on the base in two different directions.

3. The drive apparatus for driving a storage medium as set forth in claim 2 wherein at least a part of said rotating body, when rotated to said locking position, locks the inner wall of said through hole or the recess in the direction parallel to the axis of rotation of said rotating body.

4. The drive apparatus for driving a storage medium as set forth in claim 2, wherein said storage medium is in the shape of a disc, and said drive unit comprises rotating means for rotating said disc-shaped storage medium and a head facing to or being brought into contact with the rotating storage medium.

5. The drive apparatus for driving a storage medium as set forth in claim 4, wherein said drive unit is provided with clamp means for holding the center of the disc shaped storage medium onto said rotating means, and clamp driving means for driving said clamp means which serves also to rotate said rotating body to the lock releasing position when said clamp means is set by said clamp driving means to the state where said storage medium is held.

6. The drive apparatus for driving a storage medium as set forth in claim 1, wherein said rotating body, when rotated to said locking position comes in contact with two positions on the inner wall of said through hole or the recess opposing each other so that the movement of the drive unit on the base is locked in two opposite directions.

7. The drive apparatus for driving a storage medium as set forth in claim 6, wherein at least a part of said rotating body, when rotated to said locking position, locks the inner wall of said through hole or the recess in the direction parallel to said axis of rotation of said rotating body so that the movement of the drive unit on the base is locked in the direction parallel to said axis of rotation.

8. The drive apparatus for driving a storage medium as set forth in claim 6, wherein said storage medium is in the shape of a disc and said drive unit comprises rotating means for rotating said disc-shaped storage medium and a head facing to or being brought into contact with said rotating storage medium.

9. The drive apparatus for driving a storage medium as set forth in claim 8, wherein said drive unit is provided with clamp means for holding the center of the disc shaped storage medium onto said rotating device, and clamp driving means for driving said clamp means which serves also to rotate said rotating body to the lock releasing position when said clamp means is set by said clamp driving means to the state where said storage medium is held.

10. The drive apparatus for driving a storage medium as set forth in claim 1, wherein said rotating body, when rotated to said locking position, comes in contact with three positions on the inner wall of said through hole or the recess so that the movement of the drive unit on the base is locked in all directions on the plane intersecting the axis of rotation of the rotating body.

11. The drive apparatus for driving a storage medium as set forth in claim 10, wherein at least a part of said rotating body, when rotated to said locking position, locks the inner wall of said through hole or the recess in the direction parallel to said axis of the rotation of said rotating body so that the movement of the drive unit on the base is locked in the direction parallel to said axis of rotation.

12. The drive apparatus for driving a storage medium as set forth in claim 10, wherein said storage medium is in the shape of a disc and said drive unit comprises rotating means for rotating said disc-shaped storage medium and a head facing to or being brought into contact with said rotating storage medium.

13. The drive apparatus for driving a storage medium as set forth in claim 12, wherein said drive unit is provided with clamp means for holding the center of the disc shaped storage medium onto said rotating means, and clamp driving means for driving said clamp means which serves also to rotate said rotating body to the lock releasing position when said clamp means is set by said clamp driving means to the state where said storage medium is held.

14. The drive apparatus for driving a storage medium as set forth in claim 1, wherein at least a part of said rotating body, when rotated to said locking position, locks the inner wall of said through hole or the recess portion in the direction parallel to said axis of the rotating of said rotating body so that the movement of the drive unit on the base is locked in the direction parallel to said axis of rotation.

15. The drive apparatus for driving a storage medium as set forth in claim 14, wherein said storage medium is in the shape of a disc and said drive unit comprises rotating means for rotating said disc-shaped storage medium and a head facing to or being brought into contact with said rotating storage medium.

16. The drive apparatus for driving a storage medium as set forth in claim 15, wherein said drive unit is provided with clamp means for holding the center of the disc shaped storage medium onto said rotating means, and clamp driving means for driving said clamp means which serves also to rotate said rotating body to the lock releasing position when said clamp means is set by said clamp driving means to the state where said storage medium is held.

17. The drive apparatus for driving a storage medium as set forth in claim 1, wherein said storage medium is in the shape of a disc and said drive unit comprises rotating means for rotating said disc-shaped storage medium and a head facing to or being brought into contact with said rotating storage medium.

18. The drive apparatus for driving a storage medium as set forth in claim 17, wherein said drive unit is provided with clamp means for holding the center of the disc shaped storage medium onto said rotating means, and clamp driving means for driving said clamp means which serves also to rotate said rotating body to the lock releasing position when said clamp means is set by said clamp driving means to the state where said storage medium is held.

19. A drive apparatus for driving a storage medium comprising:

a magazine having a plurality of discs stored therein, and an enclosure for housing said magazine;

a base movably mounted with respect to said enclosure;

a drive unit supported with respect to said base via a resilient member for recording on and reproducing from said storage medium; and a locking device for locking said drive unit on said base when the storage medium is loaded to or ejected from the drive unit;

said locking device comprising:

one of a through hole or a non-through recess provided on one of said drive unit and the base;

a rotating body provided on the other of said drive unit and the base to be placed in said through hole or the recess; and a mechanism for rotating said rotating body;

wherein said rotating body is rotationally switched between the locking position where at least one point thereof comes in contact with an inner wall of said through hole or the recess to lock the drive unit on the base, and a lock releasing position where the rotating body comes off said inner wall in said through hole or the recess.

20. The drive apparatus for driving a storage medium as set forth in claim 19 wherein said rotating body, when rotated to said locking position, comes into contact with at least two portions of the inner wall of said through hole or the recess to lock the movement of said drive unit on the base in two different directions.

21. A drive apparatus for driving a storage medium comprising:

a base;

a drive unit for recording on or reproducing from the storage medium, wherein said drive unit is supported with respect to the base by at least one resilient member; and a locking device including:

a rotatable body provided on one of said drive unit and the base, wherein said rotatable body includes at least one locking portion extending outwardly therefrom, and the other of said drive unlit and the base includes at least one wall portion facing and in close proximity to said rotatable body;

wherein the rotatable body is selectively rotated to bring said at least one locking portion into or out of engagement with said at least one wall portion, and the locking device does not substantially project outside the drive unit in a lateral direction.

22. The drive apparatus as set forth in claim 21 wherein said rotatable body includes two locking portions, selectively rotated to come into engagement with two wall portions, to lock the movement of said drive unit with respect to the base in two different directions.

23. The drive apparatus as set forth in claim 22 wherein at least a part of said rotatable body, when rotated to said locking position, locks said drive unit with respect to the base in the direction parallel to the axis of rotation of said rotatable body.

24. The drive apparatus as set forth in claim 23, wherein the storage medium is in the shape of a disc and said drive unit includes a turntable for rotating the disc shaped storage medium, said drive unit further comprising a clamper for clamping the center of the disc shaped storage medium onto said turntable, and said rotatable body is rotated to said locking position as the disk shaped storage medium is clamped by the clamper.

* * * * *